United States Patent
Shiratani

(10) Patent No.: US 6,608,929 B1
(45) Date of Patent: Aug. 19, 2003

(54) IMAGE SEGMENTATION APPARATUS, METHOD THEREOF, AND RECORDING MEDIUM STORING PROCESSING PROGRAM

(75) Inventor: Fumiyuki Shiratani, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/579,206

(22) Filed: May 26, 2000

(30) Foreign Application Priority Data

May 28, 1999 (JP) .............................................. 11-14998

(51) Int. Cl.⁷ ................................................. G06K 9/34
(52) U.S. Cl. ....................... 382/173; 382/164; 358/464; 358/466
(58) Field of Search ................................ 382/162–167, 382/173–180; 358/450–466

(56) References Cited

U.S. PATENT DOCUMENTS

| | | | | |
|---|---|---|---|---|
| 5,444,496 | A | * 8/1995 | Gehrmann | 348/587 |
| 6,035,060 | A | * 3/2000 | Chen et al. | 382/164 |
| 6,215,893 | B1 | * 4/2001 | Leshem et al. | 382/128 |
| 6,282,317 | B1 | * 8/2001 | Luo et al. | 382/203 |
| 6,337,925 | B1 | * 1/2002 | Cohen et al. | 382/199 |
| 6,483,940 | B1 | * 11/2002 | Wang | 382/164 |

FOREIGN PATENT DOCUMENTS

JP  10-171992  6/1998

OTHER PUBLICATIONS

Yuukou Horita, et al., "Region segmentation of color images based on uniform color space", J. of Society of Electronic Information and Communications, vol. J74–D–11, No. 10, pp. 1370–1378, 1991.

* cited by examiner

Primary Examiner—Jingge Wu
(74) Attorney, Agent, or Firm—Scully, Scott, Murphy & Presser

(57) ABSTRACT

An image segmentation apparatus divides an image into plural regions according to feature quantities of pixels for composing the image, by a programmed computer. A divider divides the image into plural regions by using the separation degree of feature quantities of pixels for composing the image. A separation degree operator determines the separation of feature quantities between interior and exterior region, according to the dissimilarity of feature quantities of pixels for enclosing the boundary of plural regions divided by the divider. A changer changes the alienation degree of feature quantities of pixels enclosing the boundary between the interior and exterior region in a specific condition, by using the alienation degree of feature quantities between interior and exterior region calculated by the alienation degree operator. The divider divides the image into plural regions by using changed separation degree. A recording medium stores a computer-readable processing program for dividing an image into plural regions, according to feature quantities of pixels for composing the image, by a computer.

20 Claims, 4 Drawing Sheets

LINE ELEMENT BETWEEN ADJACENT PIXELS

CONNECTION WITH CUT END OF CONTOUR

SEPARATION DEGREE BETWEEN ADJACENT PIXELS

SEPARATION DEGREE BETWEEN INTERIOR AND EXTERIOR REGIONS

NOT CLOSED CURVE    CLOSED CURVE

RE-SETTING OF SEPARATION DEGREE

IMAGE SEGMENTATION APPARATUS, METHOD THEREOF, AND RECORDING MEDIUM STORING PROCESSING PROGRAM

CROSS-REFERENCE TO RELATED APPLICATIONS

This application is based upon claims the benefit of priority from the prior Japanese Patent Application No. 11-149998 filed May 28, 1999, the entire contents of which are incorporated herein by reference.

BACKGROUND OF THE INVENTION

The present invention relates to a segmentation technique for dividing, for example, a microscopic color image into connected regions uniform in features of the image such as color and luminance, and more particularly to the image segmentation apparatus, its method, and a recording medium in which a processing program is recorded.

Generally, typical techniques for dividing image regions include region growing method, edge extraction method, and feature space clustering method.

In the region growing method, when a small region of notice and an adjacent small region mutually have a same feature, the process for merging them into one region is repeated, and therefore the regions equal in the feature are grown gradually, and finally the region of the entire image is divided.

In the feature space clustering method, on the basis of density distribution of points mapped onto a feature space, points in the feature space are divided into clusters, and pulled back onto the image, and the region is divided.

In the edge extraction method, first, edges are detected from an image, and a closed region enclosed by the edges is regarded as one region.

Therefore, the region growing method takes an enormous time in processing.

The clustering method is difficult in processing if the cluster shape is obscure.

In the edge extraction method, edges are often discontinued, and it is hard to process edges not forming closed curves.

In an improved method to handle discontinued edges, edges near the edge end point are regarded as extension of discontinued edge, and they are connected together.

This is a technique of connecting the discontinued edges by force, but as shown in FIG. 4, it is a difficult problem to connect with which edge, and a wrong segmentation may occur if connected with a false edge.

A proposal to solved these problems is disclosed in Jpn. Pat. Appln. KOKAI Publication No. 10-171992, but this is based on the region growing method, and it takes much time in processing.

BRIEF SUMMARY OF THE INVENTION

The invention is devised in the light of the above background, and it is hence an object thereof to provide a method and apparatus for dividing an image into plural regions almost without over-segmentation and under-segmentation comprising means for decreasing connection errors of mutual ends of discontinued edges, and reducing means of over-segmentation regions occurring consequently, and more particularly a method and apparatus for dividing an image into plural regions of a shorter processing time than in region growing method, and a recording medium in which its processing program is recorded.

To achieve the object, an aspect of the invention provides an image segmentation apparatus for dividing an image into plural regions according to feature quantities of pixels for composing the image by a programmed computer comprising:
  a divider for dividing the image into plural regions by using the separation degree of feature quantities of pixels for composing the image;
  an alienation degree operator for determining the alienation degree of feature quantities between mutual regions, from the alienation degree of feature quantities of pixels enclosing the boundary of plural regions divided by the divider; and
  a changer for changing the alienation degree of feature quantities of pixels enclosing the boundary of regions in a specific condition, by using the separation degree of feature quantities of mutual regions calculated by the separation degree operator.

To achieve the object, another aspect of the invention provides an image segmentation method for dividing an image into plural regions according to feature quantities of pixels for composing the image comprising the steps of:
  dividing the image into plural regions by using the alienation degree of feature quantities of pixels for composing the image;
  determining the alienation degree of feature quantities between interior and exterior region, from the separation degree of feature quantities of pixels enclosing the boundary of plural regions; and
  changing the alienation degree of feature quantities of pixels enclosing the boundary of regions in a specific condition, by using the alienation degree of feature quantities of mutual regions.

Also to achieve the object, a still another aspect of the invention provides a recording medium storing a computer-readable processing program for dividing an image into plural regions, according to feature quantities of pixels for composing the image by a computer, the computer-readable processing program comprising:
  a program encoder for causing the computer to divide the image into plural regions, by using the alienation degree of feature quantities of pixels for composing the image;
  a program code portion for causing the computer to determine the alienation degree of feature quantities between mutual regions, from the alienation degree of feature quantities of pixels enclosing the boundary of plural regions; and
  a program code portion for causing the computer to change the alienation degree of feature quantities of pixels enclosing the boundary of regions in a specific condition, by using the alienation degree of feature quantities of mutual regions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently

DETAILED DESCRIPTION OF THE INVENTION

Figure 1:
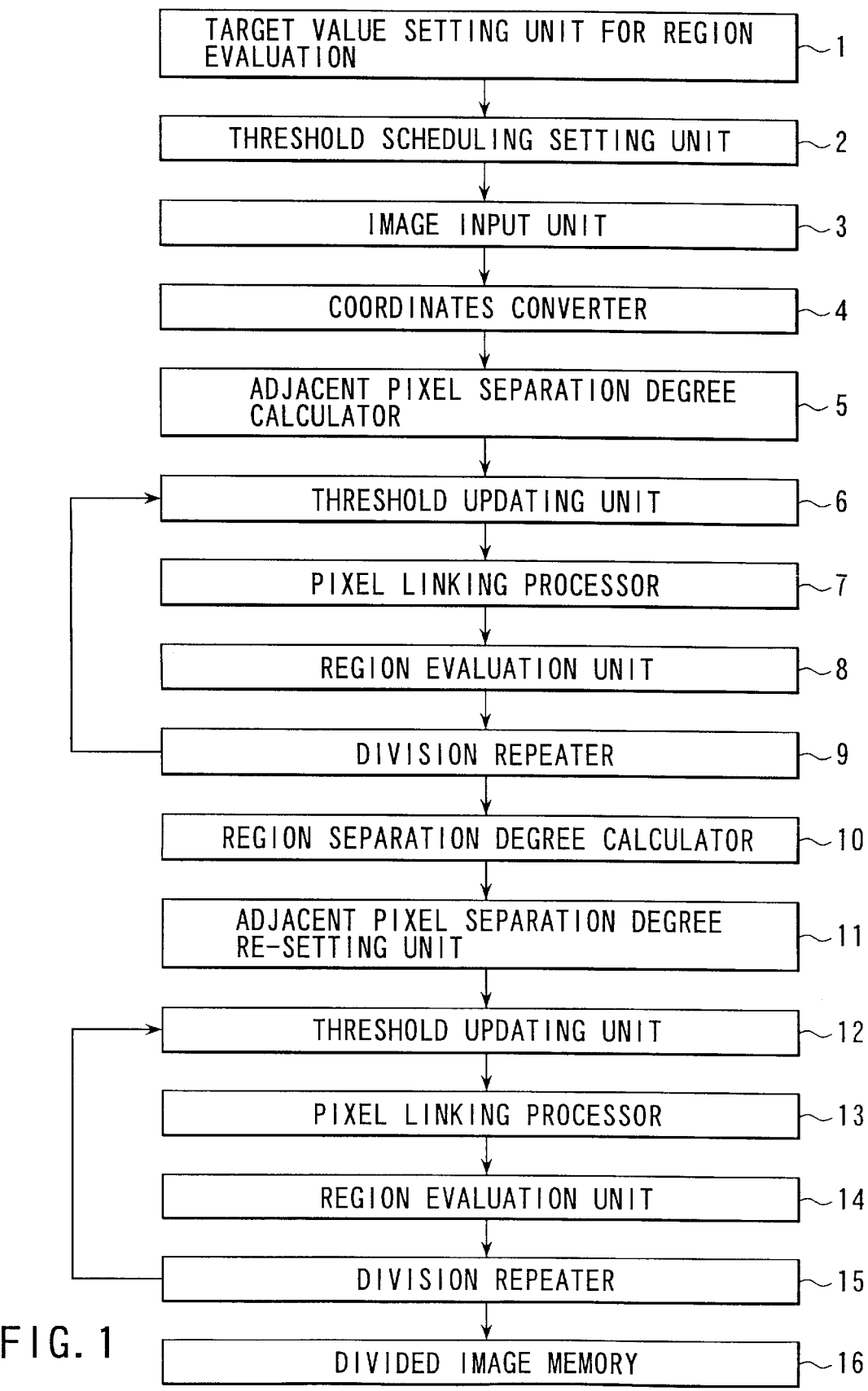
FIG. 1 is a functional block diagram for explaining an image segmentation apparatus and its method according to a first embodiment of the invention.

Reference will now be made in detail to the presently preferred embodiments of the invention as illustrated in the accompanying drawings, in which like reference numerals designate like or corresponding parts.

Referring now to the drawings, an embodiment of the invention is described in detail below.

An embodiment of segmentation apparatus and its method of the invention is explained below by referring to an example of a color image.

First, the noticing point of segmentation technique of the invention is explained.

Figure 3:
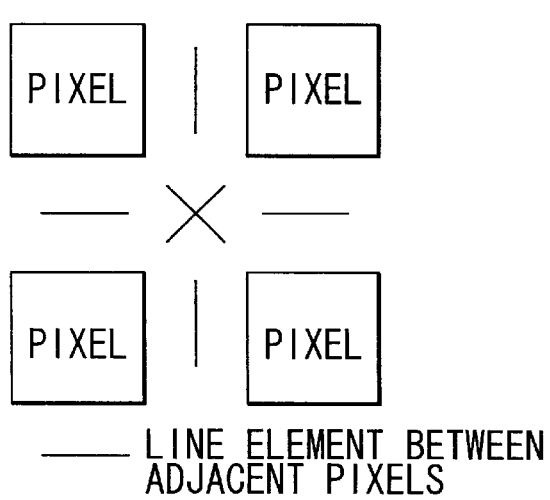
FIG. 3 is a diagram for explaining a technique of evaluating the uniformity of regions, by line elements between adjacent pixels for forming closed curves sequentially, as a noticing point of segmentation method of the invention.
Figure 4:
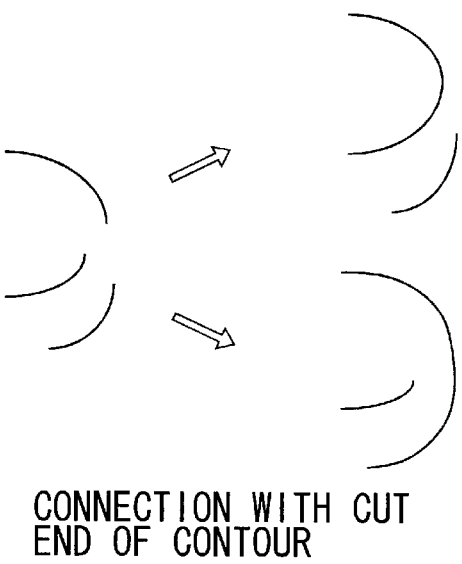
FIG. 4 is a diagram for explaining interruption of contour line and its connection relation.

That is, the segmentation technique of the invention is based on the assumption the possibility of two pixels to be classified in different regions would be higher if the color change is greater in the adjacent pixels for composing the color image is larger, and is intended to evaluate the uniformity of region, by line elements between adjacent pixels for forming closed curves sequentially in FIG. 3.

Herein, the line elements between adjacent pixels may not be strictly defined edges.

Figure 5:
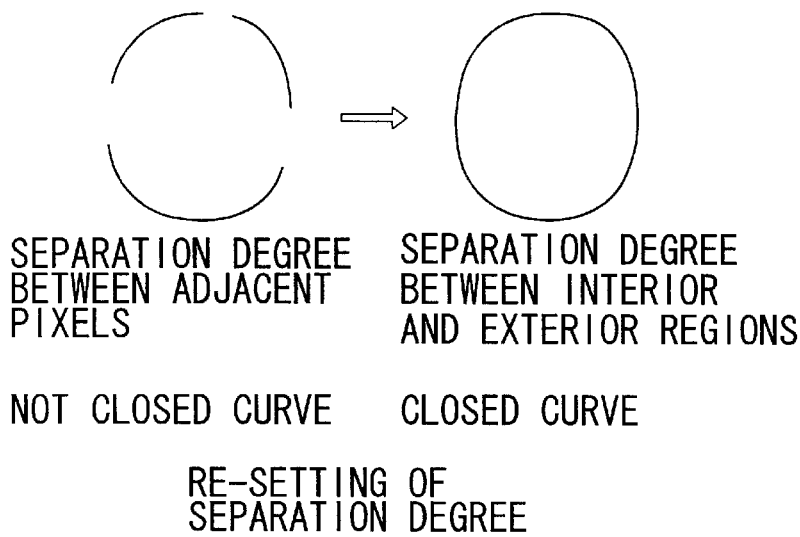
FIG. 5 is a diagram for explaining a technique for showing even line elements of smaller degree of separation until connected, if hard to connect in part, in the process of line elements between adjacent pixels about to form a closed curve, as a noticing point of segmentation method of the invention.

Further, as shown in FIG. 5, if the line elements between adjacent pixels are about to form closed curves, it is sometimes difficult to connect in part.

In such a case, until connected completely, line elements of small degree of separation (weak edges) are also displayed.

After forming one closed curve, the average (or maximum) value of the separation degree between pixels on the closed curve is calculated.

This value is called the region separation degree.

A small value of separation degree between pixels on the closed curve is replaced by the value of this region separation degree, and the same procedure is executed from the beginning.

This time, the closed curve is formed in an early state, and division more than necessary hardly occurs.

On the basis of such noticing point, the image segmentation apparatus and its method according to the invention is explained below while referring to FIG. 1 and FIG. 6.

First Embodiment

Figure 6:
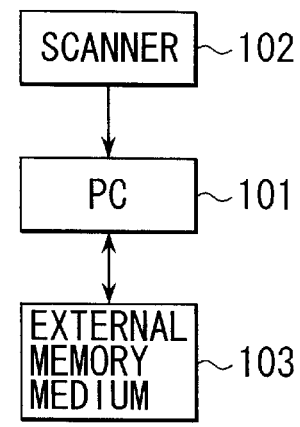
FIG. 6 is a conceptual diagram for explaining the image segmentation apparatus and its method of the invention.

That is, in the invention, as shown in FIG. 6, the image segmentation process is executed, for example, in the processing procedure described below by taking in the image to be divided into regions from an image input unit 102 such as scanner into a personal computer 101.

At this time, it is supposed that a program for processing this image region division is loaded preliminarily in the personal computer 101 from an external recording medium 103 storing it.

Therefore, the following explanation of FIG. 1 is, for the sake of convenience, based on function blocks 1 to 16 in a form of including the processing procedure of the personal computer 101 and the program from the external memory medium 103 in FIG. 6.

First, in a target value setting unit 1 for evaluating the region, as the target value, the maximum of the distance (color difference) of two points in the color space in each region to be divided into regions is set at 10 or less.

For setting this target value, it is enough to use the corresponding relation between the color difference of two colors in the uniform color space described later and the color difference discerned by the human.

For example, if the distance (color difference) of two points is 10 or more, it is known that it tends to be discerned as a different color system.

Next, in a threshold scheduling setting unit 2, the initial value of the threshold and the threshold updating interval width are set.

As mentioned below, since the adjacent pixel separation degree is normalized from 0 to value of 1, for example, the threshold Th is scheduled as follows.

Th=1.0*0.9t (t: number of times of updating).

By an image input unit 3, the color image to be divided is taken in as data of, for example, three primaries, R, G, B.

By a coordinates converter 4, the image input data is transformed in coordinates, and copied into an HVC uniform color space.

This conversion technique is described in "Region segmentation of color images based on uniform color space" (J. of Society of Electronic Information and Communications, Vol, J74-D-11, No. 10, pp. 1370–1378, 1991), and the detail is omitted here.

By an adjacent pixel separation degree calculator 5, the color difference of adjacent pixels is calculated, and it is called the separation (alienation) degree of adjacent pixels.

The method of calculating the separation degree is explained below.

Suppose there are four pixels A, B, C, D existing adjacently on a same straight line.

The RGB values of these four pixels have been transformed in coordinates into the HVC uniform color space by the coordinates converter 4.

The HVC uniform color space is expressed by using cylindrical coordinates, and the scale of the coordinates is set so as to be comparative with the Munsell color sensation.

The four points after coordinates transformation are respectively assigned with position vectors $\alpha, \beta, \gamma, \delta$.

The inner product $(\gamma-\alpha) \times (\delta-\beta)$ of their differential vectors $(\gamma-\alpha)$ and $(\delta-\beta)$ is calculated by the adjacent pixel separation degree calculator 4.

The value of the inner product is larger when the change is larger in the distance in color space and the change is smaller in the direction in color space.

The larger the inner product, the higher is the possibility of points A, B, and points C, D being classified into different regions as regions having different features.

The possible range of this value is normalized from 0 to 1 by using the maximum value and minimum value, and it is called the separation degree of points B and C.

Or, assuming a line element between pixels, such as between a pixel and other pixel shown in FIG. 3, the separation degree of points B and C may be also expressed as the separation degree of line element between pixels.

In an image linking processor 7, if the separation degree set between adjacent pixels is smaller than the presently set threshold, these adjacent pixels are regarded to belong to a same region, and are assigned with a same label, which is the linking process of pixels.

In other words, a same label cannot be attached to a next pixel across the line element between pixels having a larger separation degree than the threshold.

However, a same label may be given indirectly by turning around.

In a region evaluation unit 8, the size of cluster in color space in each region is evaluated, and if it is smaller than the target value, the division of this region is terminated.

If over the target value, further, by a division repeater 9, the process returns to a threshold updating unit 6, and after updating the threshold, the pixels are connected and labeled in the pixel linking processor 7.

This procedure is repeated until the evaluated value of size of the cluster in the color space becomes smaller than the target value in all regions.

The method of calculating the evaluated value of size of cluster is explained briefly below.

First, the average position of the cluster in the color space is determined, and the maximum distance d in the cluster from this average position is determined, then this value d is obtained as the evaluated value of the size of the cluster.

Instead of the maximum distance d, the variance value may be used, but it is a merit of using the maximum distance d that the maximum value (maximum diameter of cluster) of distance between two points in the cluster can be estimated at most at $2d$.

In a region separation degree calculator 10, calculating the average value (or maximum value) on the boundary line of the separation degree of line element between pixels forming the boundary line of the region, it is called the separation degree of region, and it is executed in all regions.

In an adjacent pixel separation degree re-setting unit 11, the line element between pixels forming a part of the boundary line of the region is combined with the separation degree of region, and the maximum value of the separation degree of adjacent pixels calculated in the first place, and the separation degree of this line element is newly obtained.

As a result, for example, the boundary line of the region partially possessing the region smoothly changing in the color feature, which could not be obtained as a closed curved unless the threshold was lowered considerably before re-setting, can extract the region without lowering the threshold so much after re-setting, so that occurrence of unnecessary over-segmentation can be prevented.

In succession, in a threshold updating unit 12, a pixel linking processor 13, a region evaluation unit 14, and division repeater 15, the same process as in the threshold updating unit 6, pixel linking processor 7, region evaluation unit 8, and division repeater 9 is executed, and repeated until the size of the cluster in the color space becomes smaller than the evaluated value in all connected regions.

Finally, the result of division is stored in a divided image storage unit 16, and a series of segmentation process is completed.

Second Embodiment

After re-setting by the adjacent pixel separation degree re-setting unit 11, the present threshold is increased, for example, by 1.1 times each on every occasion of updating.

After linking process in the pixel linking processor 13, the evaluated value of the region is calculated in the region evaluation unit 14, and when it does not satisfy the target, the division result of one state before is stored in the divided image storage unit 16.

Figure 2:
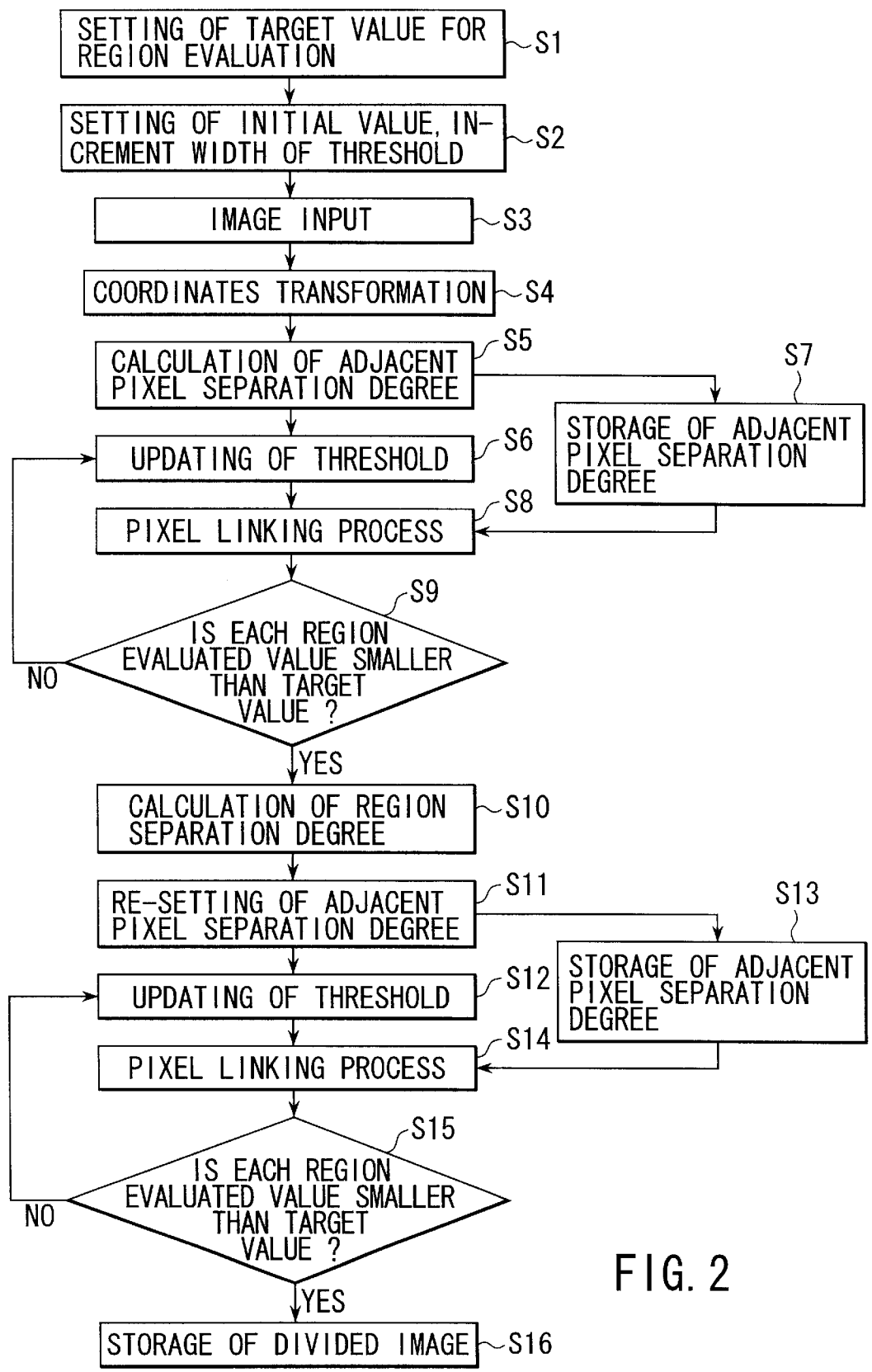
FIG. 2 is a flowchart showing the flow of process in the first embodiment of the invention.

The processing flow in the first embodiment is summarized in a flowchart in FIG. 2.

A target value for region evaluation is set (step S1), the initial value and increment width of threshold are set (step S2), an image is input (step S3), and coordinates are transformed (step S4).

The adjacent pixel separation degree is calculated (step S5), and this value is stored (step S7).

After updating the threshold (step S6), the pixels are connected on the basis of this threshold (step S8).

Judging if the evaluated value of each region is smaller than the target or not (step S9), if the evaluated value of all regions is smaller than the target, the region separation degree is calculated (step S10), and the separation degree of adjacent pixels is set again (step S11).

After initializing the threshold on the basis of the newly set separation degree, updating of threshold, linking of pixels, evaluation of region, and comparison with target are executed, and this procedure is repeated until becoming smaller than the target, and finally the region division result is stored (steps S12 to S16).

Figure 7:
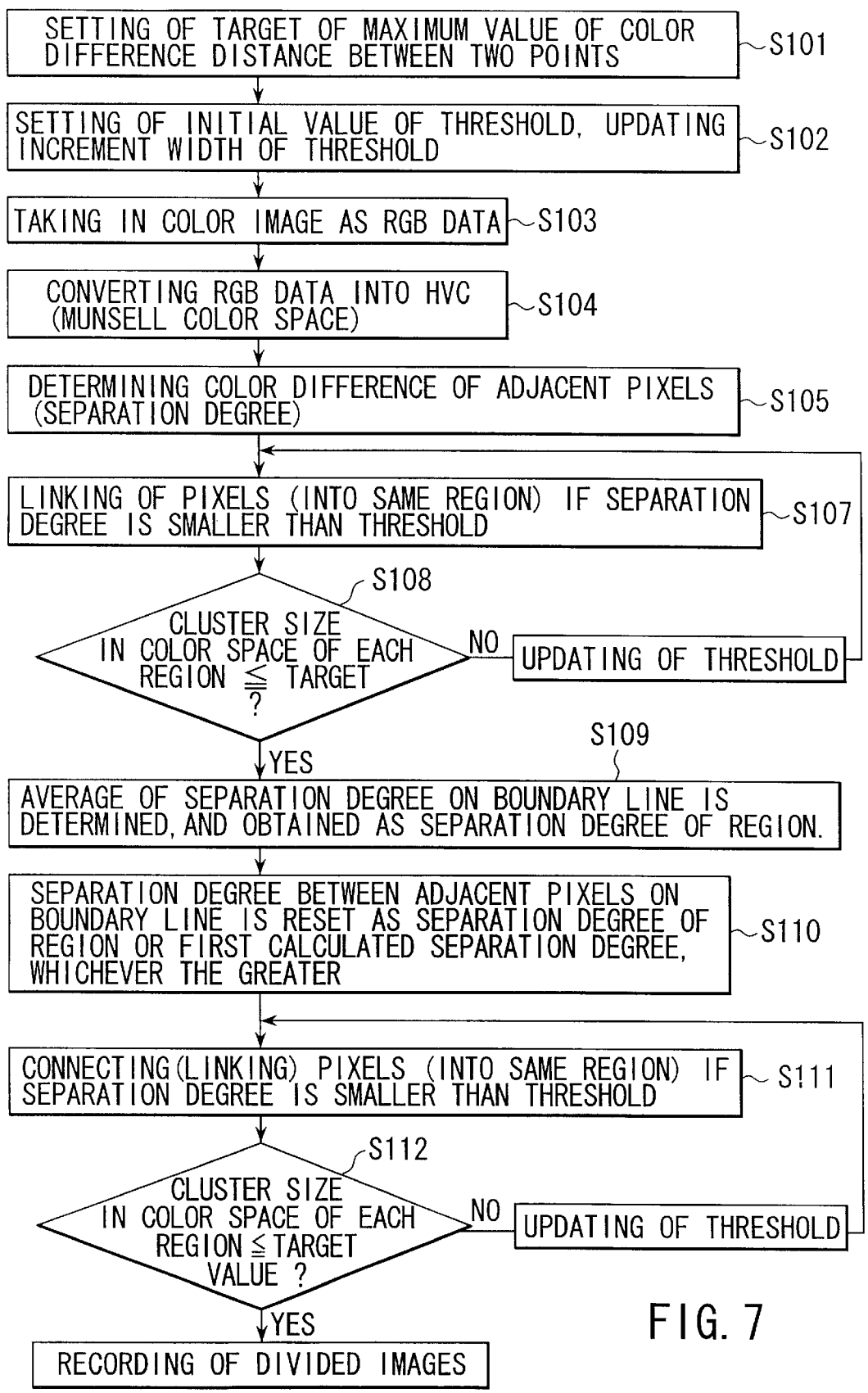
FIG. 7 is a flowchart for supplementing the explanation of FIGS. 1 and 2.

FIG. 7 is a flowchart as a supplement to explanation of FIG. 1 and FIG. 2.

First, at step S101, as target value setting for region evaluation, the target of maximum value of color difference distance between two points is set.

At step S102, the initial value of threshold, and updating increment width of threshold are set.

At step S103, a color image is taken in as RGB data.

At step S104, the RGB data is transformed into HVC (Munsell color space).

At step S105, color difference of adjacent pixels (separation degree, that is, alienation degree) is determined.

At step S107, when the separation degree is smaller than the threshold, the pixels are connected (to be in same region).

At step S108, judging cluster size in color space of each region ≦ target value?, if Yes, the process moves to step S107, and if No, the threshold is updated at step S106, and the process returns to step S107.

At step S109, the average of the separation degrees on the boundary line is determined, and the separation degree of the region is obtained.

At step S110, the separation degree of pixels on the boundary line is set again in the separation degree of the region or the initially calculated separation degree, whichever the greater.

At step S111, when the separation degree is smaller than the threshold, the pixels are connected (to be in same region).

At step S112, judging cluster size in color space of each region≦target value?, if Yes, the process moves to step S114, and if No, the threshold is updated at step S113, and the process returns to step S111.

Finally, at step S114, the divided image is recorded.

Thus, according to the invention, in order to eliminate discontinued division line in the region, the threshold for determining presence or absence of generation of division line is lowered until a closed division line is obtained, and hence it is effective to decrease connection errors by linking of mutual ends of discontinued edges by force.

Further, in the invention, to curtail the over-segmentations occurring due to lowering of the threshold, the generation value of each division line for forming a closed curve is set again depending on the information near the closed curve, and the threshold is processed again, and therefore over-segmentations can be decreased.

In the invention, every time a region not uniform in feature such as color and luminance is newly divided, the uniformity of feature of the region is evaluated, and division of the region satisfying the desired target is stopped, so that over-division of the region more than necessary can be prevented.

As a result, in the invention, over-segmentations are few, and under-segmentation exceeding the desired target does not occur, so that an ideal division of region is realized.

According to the invention as set forth in claim 1 to claim 3, even in the image smoothly changing in the feature quantity, the region enclosed by a closed curve can be easily obtained.

According to the invention as set forth in claim 4 to claim 9, the closed curve enclosing a region is obtained more accurately, and over-division can be prevented.

According to the invention as set forth in claim 11, in order to eliminate discontinued division line in the connected region, the threshold for determining presence or absence of generation of division line element is lowered until a closed division line is obtained, and hence it is effective to decrease connection errors by linking of mutual ends of discontinued edges by force.

According to the invention as set forth in claim 11, further, to curtail the over-segmentations occurring due to lowering of the threshold, the generation value of each division line element for forming a closed curve is set again depending on the information near the closed curve, and the same process is repeated, so that it is effective to decrease over-segmentations.

Also according to the invention as set forth in claim 11, every time a region not uniform in feature such as color and intensity is newly divided, the uniformity of feature of the region is evaluated, and division of the region satisfying the desired target is stopped, so that over-division of the region more than necessary can be prevented.

As a result, in the region division according to the invention as set forth in claim 11, over-segmentations are few, and over-integrated regions are also few by satisfying the desired target.

As explained herein, the invention provides a method and apparatus for dividing an image region small in over-divided and over-integrated regions comprising means for decreasing connection errors by linking of mutual ends of discontinued edges, and means for curtailing the occurrence of over-segmentations, and further a method and apparatus for dividing an image region shorter in processing time than in the region growing method, and a recording medium in which such processing program is recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image segmentation apparatus for dividing an image into plural regions according to feature quantities of pixels for composing the image by a programmed computer comprising:

a divider for dividing the image into plural regions by using the separation degree of feature quantities of pixels for composing the image;

a separation degree operator for determining the alienation degree of feature quantities between mutual regions, from the alienation degree of feature quantities of pixels enclosing the boundary of plural regions divided by the divider; and a changer for changing the separation degree of feature quantities of pixels enclosing from inside and outside the boundary of regions in a specific condition, by using the alienation degree of feature quantities between interior and exterior calculated by the separation operator.

2. An image segmentation method for dividing an image into plural regions according to feature quantities of pixels for composing the image comprising the steps of:

dividing the image into plural regions by using the alienation degree of feature quantities of pixels for composing the image;

determining the alienation degree of feature quantities between interior and exterior region, from the alienation degree of feature quantities of pixels enclosing the boundary of plural regions; and changing the alienation degree of feature quantities of pixels enclosing the boundary of regions in a specific condition, by using the alienation degree of feature quantities of mutual regions.

3. A recording medium storing a computer-readable processing program for dividing an image into plural regions, according to feature quantities of pixels for composing the image by a computer, the computer-readable processing program comprising:

a program encoder for causing the computer to divide the image into plural regions, by using the alienation degree of feature quantities of pixels for composing the image;

a program encoder for causing the computer to determine the alienation degree of feature quantities between mutual regions, from the alienation degree of feature quantities of pixels enclosing the boundary of plural regions; and a program encoder for causing the computer to change the alienation degree of feature quantities of pixels enclosing the boundary of regions in a specific condition, by using the alienation degree of feature quantities of mutual regions.

4. An image segmentation apparatus for dividing an image into plural regions according to feature quantities of pixels for composing the image comprising:
  a first processor for evaluating the alienation degree of feature quantities between adjacent pixels, and linking the adjacent pixels when the alienation degree is smaller than a specified threshold; and
  a second processor for repeating the process while changing the threshold until the size in the feature quantity space in the region formed by linking by the first processor becomes smaller than a specified target.

5. An image segmentation method for dividing an image into plural regions according to feature quantities of pixels for composing the image comprising the steps of:
  evaluating the alienation degree of feature quantities between adjacent pixels, and linking the adjacent pixels when the alienation degree is smaller than a specified threshold; and
  repeating the process while changing the threshold until the size in the feature quantity space in the region formed by the linking process becomes smaller than a specified target.

6. A recording medium storing a computer-readable processing program for executing a method of dividing an image into plural regions, according to feature quantities of pixels for composing the image by a computer, the computer-readable processing program comprising:
  a program code portion for causing the computer to evaluate the alienation degree of feature quantities between adjacent pixels, and link the adjacent pixels when the alienation degree is smaller than a specified threshold; and
  a program code portion for causing the computer to repeat the process while changing the threshold until the size in the feature quantity space in the region formed by the linking process becomes smaller than a specified target.

7. An apparatus for dividing an image into plural regions according to feature quantities of pixels for composing the image comprising:
  a first processor for evaluating the alienation degree of feature quantities between adjacent pixels, and linking the adjacent pixels when the alienation degree is smaller than a specified threshold;
  a second processor for repeating the process while changing the threshold until the size in the feature quantity space in the region formed by linking by the first processor becomes smaller than a specified target;
  a third processor for determining the alienation degree of feature quantities between mutual regions, according to the alienation degree of feature quantities between adjacent pixels across the boundary, in the region determined by the second processor; and
  a fourth processor for comparing the alienation degree of feature quantities between adjacent pixels across the boundary of the region with the alienation degree between regions, and changing the alienation degree of feature quantities between adjacent pixels across the boundary of the region depending on the result of this comparison.

8. A method for dividing an image into plural regions according to feature quantities of pixels for composing the image comprising the steps of:
  evaluating the alienation degree of feature quantities between adjacent pixels, and linking the adjacent pixels when the alienation degree is smaller than a specified threshold;
  repeating the process while changing the threshold until the size in the feature quantity space in the region formed by the linking process of adjacent pixels becomes smaller than a specified target;
  determining the alienation degree of feature quantities between mutual regions, according to the alienation degree of feature quantities between adjacent pixels across the boundary, in the region formed by the linking process of adjacent pixels; and
  comparing the alienation degree of feature quantities between adjacent pixels across the boundary of the region with the alienation degree between regions, and changing the alienation degree of feature quantities between adjacent pixels across the boundary of the region depending on the result of this comparison.

9. A recording medium storing a computer-readable processing program for executing a method of dividing an image into plural regions, according to feature quantities of pixels for composing the image by a computer, the computer-readable processing program comprising:
  a program code portion for causing the computer to evaluate the alienation degree of feature quantities between adjacent pixels, and link the adjacent pixels when the alienation degree is smaller than a specified threshold;
  a program code portion for causing the computer to repeat the process while changing the threshold until the size in the feature quantity space in the region formed by the linking process becomes smaller than a specified target;
  a program code portion for causing the computer to determine the alienation degree of feature quantities between mutual regions, according to the alienation degree of feature quantities between adjacent pixels across the boundary, in the region formed by the linking process; and
  a program code portion for causing the computer to compare the alienation degree of feature quantities between adjacent pixels across the boundary of the region with the alienation degree between regions, and changing the alienation degree of feature quantities between adjacent pixels across the boundary of the region depending on the result of this comparison.

10. An image segmentation apparatus for dividing an image into plural regions according to feature quantities of pixels for composing the image comprising:
  an image input unit for entering an image to be divided;
  a target value setting unit for region evaluation for defining the degree of uniformity of region features of the image to be divided input through the image input unit as the target for region evaluation;
  a threshold scheduling setting unit for setting the initial value and increment width of the threshold used in judgment of continuity between pixels for composing the image to be divided input through the image input unit;
  a coordinates converter for converting the image into feature quantities preferably for judging the similarity of color of pixels for composing the image to be divided input through the image input unit;
  an adjacent pixel separation degree calculator for calculating the difference in features of adjacent pixels for composing the image to be divided input through the image input unit;
  a threshold updating unit for updating the threshold according to setting by the threshold scheduling setting unit;

an image linking processor for attaching same labels to similar pixels for composing the image to be divided input through the image input unit;

a region evaluation unit for generating an evaluated value of a region corresponding to the target for region evaluation by the target value setting unit for region evaluation, and comparing with the target;

a division repeater for dividing recursively until the evaluated value of all regions by the region evaluation unit becomes smaller than the target;

a region separation degree calculator for calculating the separation degree of region from the information near the boundary line of the region by the region evaluation unit;

an adjacent pixel separation degree re-setting unit for re-setting the separation degree of adjacent pixels by using the separation degree of the region calculated in the region separation degree calculator; and a divided image storage unit for recording the result of division by the division repeater.

11. The image segmentation apparatus of any one of claims 1, 4, 7, and 10, wherein the feature quantities are feature quantities relating to colors.

12. The image segmentation method of any one of claims 2, 5, and 8, wherein the feature quantities are feature quantities relating to colors.

13. The recording medium storing an image segmentation process program of any one of claims 3, 6, and 9, wherein the feature quantities are feature quantities relating to colors.

14. An image segmentation apparatus for dividing an image into plural regions according to feature quantities of pixels for composing the image by a programmed computer comprising:

dividing means for dividing the image into plural regions by using the alienation degree of feature quantities of pixels for composing the image;

alienation degree operating means for determining the alienation degree of feature quantities between mutual regions, from the alienation degree of feature quantities of pixels enclosing the boundary of plural regions divided by the dividing means; and changing means for changing the alienation degree of feature quantities of pixels enclosing the boundary of regions in a specific condition, by using the alienation degree of feature quantities of mutual regions calculated by the alienation degree operating means.

15. A recording medium storing a computer-readable processing program for dividing an image into plural regions, according to feature quantities of pixels for composing the image by a computer, the computer-readable processing program comprising:

program code means for causing the computer to divide the image into plural regions, by using the alienation degree of feature quantities of pixels for composing the image;

program code means for causing the computer to determine the alienation degree of feature quantities between mutual regions, from the alienation degree of feature quantities of pixels enclosing the boundary of plural regions; and program code means for causing the computer to change the alienation degree of feature quantities of pixels enclosing the boundary of regions in a specific condition, by using the alienation degree of feature quantities of mutual regions.

16. An image segmentation apparatus for dividing an image into plural regions according to feature quantities of pixels for composing the image comprising:

first processing means for evaluating the alienation degree of feature quantities between adjacent pixels, and linking the adjacent pixels when the alienation degree is smaller than a specified threshold; and second processing means for repeating the process while changing the threshold until the size in the feature quantity space in the region formed by linking by the first processing means becomes smaller than a specified target.

17. A recording medium storing a computer-readable processing program for executing a method of dividing an image into plural regions, according to feature quantities of pixels for composing the image by a computer, the computer-readable processing program comprising:

program code means for causing the computer to evaluate the alienation degree of feature quantities between adjacent pixels, and link the adjacent pixels when the alienation degree is smaller than a specified threshold; and program code means for causing the computer to repeat the process while changing the threshold until the size in the feature quantity space in the region formed by the linking process becomes smaller than a specified target.

18. An apparatus for dividing an image into plural regions according to feature quantities of pixels for composing the image comprising:

first processing means for evaluating the alienation degree of feature quantities between adjacent pixels, and linking the adjacent pixels when the alienation degree is smaller than a specified threshold;

second processing means for repeating the process while changing the threshold until the size in the feature quantity space in the region formed by linking by the first processing means becomes smaller than a specified target;

third processing means for determining the alienation degree of feature quantities between mutual regions, according to the alienation degree of feature quantities between adjacent pixels across the boundary, in the region determined by the second processing means; and fourth processing means for comparing the alienation degree of feature quantities between adjacent pixels across the boundary of the region with the alienation degree between regions, and changing the alienation degree of feature quantities between adjacent pixels across the boundary of the region depending on the result of this comparison.

19. A recording medium storing a computer-readable processing program for executing a method of dividing an image into plural regions, according to feature quantities of pixels for composing the image by a computer, the computer-readable processing program comprising:

program code means for causing the computer to evaluate the alienation degree of feature quantities between adjacent pixels, and link the adjacent pixels when the alienation degree is smaller than a specified threshold;

program code means for causing the computer to repeat the process while changing the threshold until the size in the feature quantity space in the region formed by the linking process becomes smaller than a specified target;

program code means for causing the computer to determine the alienation degree of feature quantities between mutual regions, according to the alienation degree of feature quantities between adjacent pixels across the boundary, in the region formed by the linking process; and program code means for causing the computer to compare the alienation degree of feature quantities between adjacent pixels across the boundary of the region with the alienation degree between regions, and changing the alienation degree of feature quantities between adjacent pixels across the boundary of the region depending on the result of this comparison.

20. An image segmentation apparatus for dividing an image into plural regions according to feature quantities of pixels for composing the image comprising:

image input means for entering an image to be divided;

target value setting means for region evaluation for defining the degree of uniformity of region features of the image to be divided input through the image input means as the target for region evaluation;

threshold scheduling setting means for setting the initial value and increment width of the threshold used in judgment of continuity between pixels for composing the image to be divided input through the image input means;

coordinates converting means for converting the image into feature quantities preferably for judging the similarity of color of pixels for composing the image to be divided input through the image input means;

adjacent pixel separation degree calculating means for calculating the difference in features of adjacent pixels for composing the image to be divided input through the image input means;

threshold updating means for updating the threshold according to setting by the threshold scheduling setting means;

pixel linking processing means for attaching same labels to pixels for composing the image to be divided input through the image input means;

region evaluating means for generating an evaluated value of a region corresponding to the target for region evaluation by the target value setting means for region evaluation, and comparing with the target;

division repeating means for dividing recursively until the evaluated value of all regions by the region evaluating means becomes smaller than the target;

region separation degree calculating means for calculating the separation degree of region from the information near the boundary line of the region by the region evaluating means;

adjacent pixel separation degree re-setting means for re-setting the separation degree of adjacent pixels by using the separation degree of the region calculated in the region separation degree calculating means; and divided image storing means for recording the result of division by the division repeating means.

* * * * *